March 22, 1932.    C. A. BREWER ET AL    1,850,704
BUTTER CHIP CUTTER
Filed Aug. 15, 1929    3 Sheets-Sheet 2
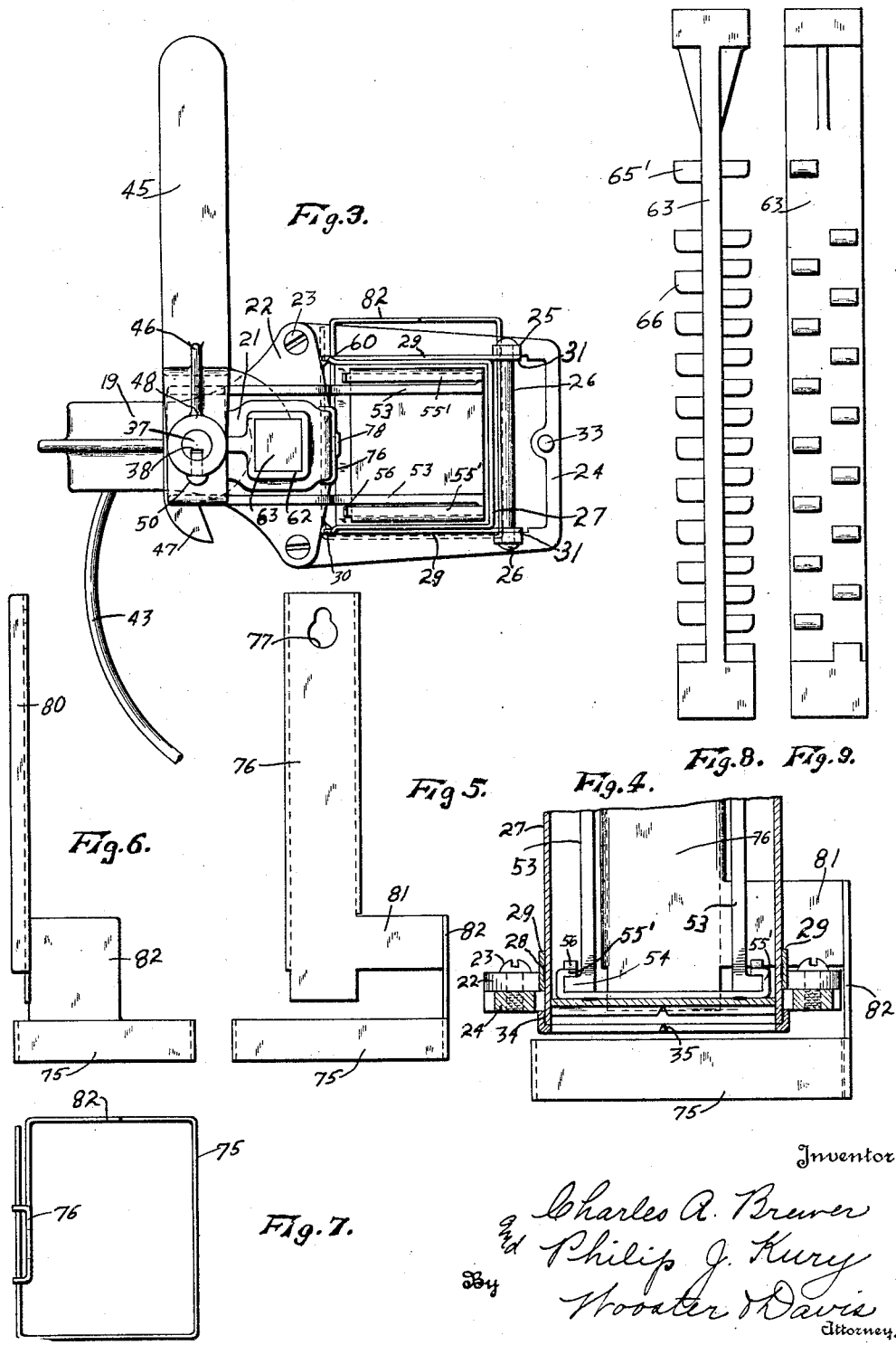
Inventors
Charles A. Brewer
and Philip J. Kury
By Wooster & Davis
Attorneys March 22, 1932.  C. A. BREWER ET AL  1,850,704
BUTTER CHIP CUTTER
Filed Aug. 15, 1929    3 Sheets-Sheet 3

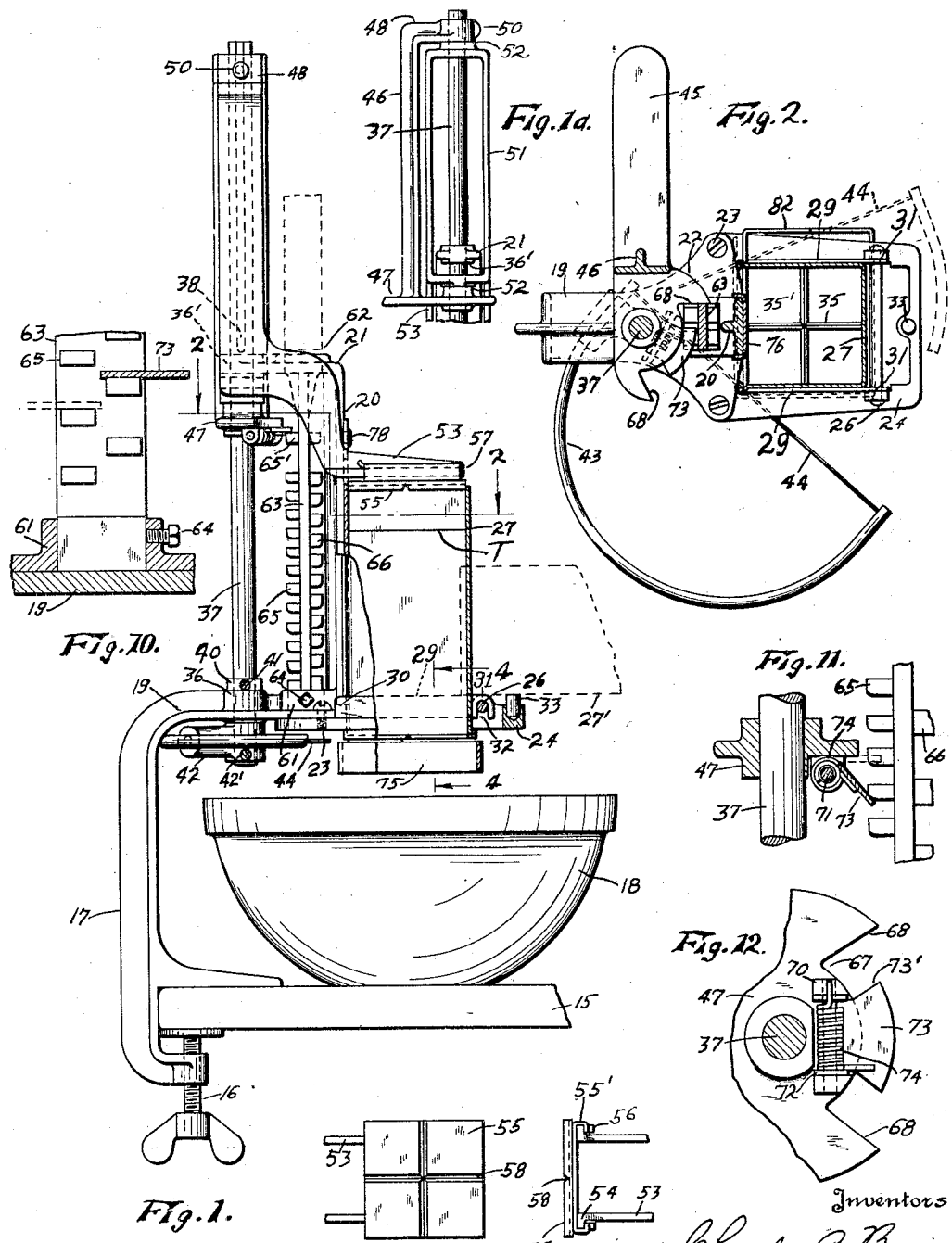

Inventors
Charles A. Brewer
and Philip J. Kury
By Wooster & Davis
Attorneys

Patented Mar. 22, 1932

1,850,704

UNITED STATES PATENT OFFICE

CHARLES A. BREWER, OF NOROTON HEIGHTS, CONNECTICUT, AND PHILIP J. KURY, OF ARVERNE, NEW YORK; SAID BREWER ASSIGNOR TO SAID KURY

BUTTER CHIP CUTTER

Application filed August 15, 1929. Serial No. 386,076.

This invention relates to a device for cutting butter into chips, especially for hotel and restaurant service, and has for an object to provide a device for cutting the butter quickly and cleanly without being touched by the human hand.

A further object of this invention is to provide a butter chip cutting device wherein all the parts that come in contact with the butter may be easily cleaned.

A still further object of this invention is to provide a butter chip cutting machine which will cut the chips to a uniform size, thus always producing the same number of chips per pound of butter, and in which the predetermined size may be made greater or smaller as desired by reversing or replacing a single element, yet which cannot be tampered with to manually change the adjustment.

An additional object of this invention is to provide a butter chip cutting machine in which the chips fall downwardly as they are cut, and may be caught in a bowl of iced water placed therebeneath, eliminating the necessity for handling the chips before they are to be used.

It is a still further object to provide a device of this character which can be easily operated with one hand to quickly cut the butter.

Another additional object of this invention is to provide a means for keeping the butter cold and hard while in place in said machine.

With the foregoing and other objects in view, the invention consists in certain novel features of construction, combinations and arrangements of parts as will be more fully described in connection with the accompanying drawings.

In these drawings:

Fig. 1 is a vertical plan view of an embodiment of this invention, certain parts being in section.

Fig. 1a is an elevation of the upper part looking from the left of Fig. 1.

Fig. 2 is a horizontal section on line 2—2 of Fig. 1.

Fig. 3 is a top plan view of the device.

Fig. 4 is a fragmentary cross section on line 4—4 of Fig. 2.

Figs. 5, 6 and 7 are front, side and top elevations respectively of the chip guard and the means for removably attaching the same to the device.

Figs. 8 and 9 are side and front elevations of the removable step by step measuring stick.

Fig. 10 is a fragmentary detail of the lower portion of the measuring stick in operation, and the means for preventing manual tampering therewith, partly in section.

Fig. 11 is a fragmentary detail of the pivoted tongue on the handle bracket and the measuring stick.

Fig. 12 is a fragmentary top detail of the tongue and part of the handle bracket.

Figs. 13 and 14 are bottom and side plan views of the removable feed plate.

Figure 15:
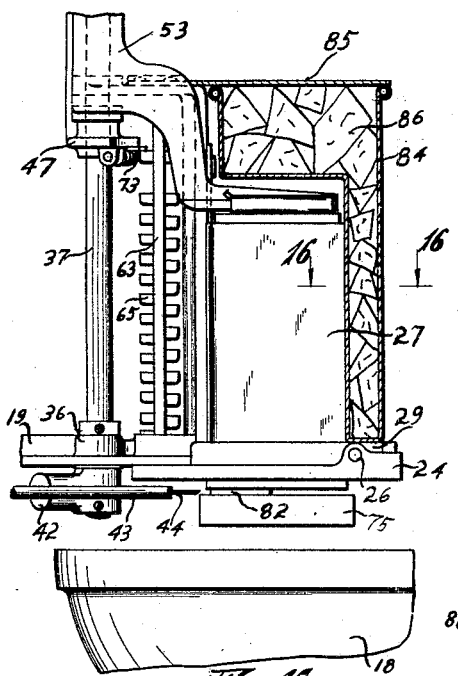
Fig. 15 is a partial side elevation and vertical section of the device showing a refrigerant container in section, removably fitted on the butter holder in the device, the section being on line 15—15 of Fig. 16.

There is shown at 15 the edge of a table or ledge to which is removably attached by any suitable means as a wing nut and screw 16 the supporting bracket 17. Placed on the table 15 is the serving bowl 18 which may contain iced water to receive the chips as they fall from the cutting means, and to store such chips until they are used.

The bracket 17 has a horizontal portion at 19, a vertical portion at 20 and another horizontal portion at 21. Projecting laterally from the sides of portion 19 at its junction with vertical portion 20 are a pair of wings 22 to which is attached by screws 23 a rectangular frame 24. A pair of ears 25 projecting upwardly adjacent the unattached end of frame 24 have a shaft 26 which acts as a support for one side of the butter holder 27 as well as a turning pivot therefor. The butter holder 27 comprises a member U-shaped in cross section usually of a size to hold a pound of butter, and is preferably enamelled on the inside wherever the butter comes in contact thereto to avoid getting metal stains on the butter. Affixed thereto as by spot welding as at 28 adjacent the lower end on opposite sides are a pair of straps 29 whose ends project beyond the holder so as to have one pair of ends 30 adjacent the open side of the holder rest on frame 24, while the other pair of ends 31 have inverted U-shaped notches 32 to fit over shaft 26 and support the holder in operative position. When it is desired to place butter in the holder, it is swung outwardly about shaft 26 until it comes to the position shown in dotted outline at 27' in Fig. 1, resting against a rubber supporting pad 33 placed in frame 24. When in this position, the notches 32 will have their sides in horizontal instead of vertical position, and thus support the holder while in this filling position. As will be obvious, due to the open notches 32, the holder 27 may be readily removed for cleaning by simply lifting it off when in partially inclined position, and as easily replaced. Affixed to the bottom of holder 27, as by spot welding 34, are the separator blades 35, which are V-shape in cross section to cut the butter longitudinally as it is fed or forced through the holder, and thus the square or rectangular openings 35' between these members determine the size and shape of the cut chips or pieces of butter.

The means for feeding the butter through the holder and cutting off the chips are as follows. A pair of bearings 36 and 36' are formed in bracket portions 19 and 21 respectively and passing through these bearings is a spindle 37, which projects a substantial distance above bracket portion 21, this projecting portion being splined or provided with a longitudinal keyway as at 38. The spindle 37 is rotatably held in position by a collar 40 affixed thereto by a set screw 41 just above bearing 36 in bracket portion 19. A bracket 42 is affixed to the end of spindle 37 below bracket portion 19 by a set screw 42' and also serves as a collar to prevent spindle 37 from being drawn upward through the bearing 36. Affixed to bracket 42 is a bow 43 holding the bow string butter cutting blade or wire 44, which is usually of very fine piano wire. As is obvious rotation of spindle 37 will rotate 43, and the wire 44 is so placed as to normally just clear the lower side of separator blades 35 on holder 27 and as spindle 37 is rotated back and forth, wire 44 will cut off any butter that has been forced or fed past the blades 35. To rotate the spindle back and forth, a handle 45 projects from a U-shape bracket 46, one arm 47 of bracket 46 encircling spindle 37 between collar 40 and upper bracket portion 21, while the other arm 48 encircles splined portion of the spindle 37 above the bearing 36' and has a stud 50 therethrough projecting into the keyway or groove 38.

Thus handle 45 will move the bow wire 44 back and forth across the under side of cutters 35 in cutting operation when the handle is swung back and forth to turn shaft 37 about its axis, but will not affect the wire when it is moved vertically up or down.

The downward movement of handle 45 serves to feed the butter through the holder 27 past the blades 35, as follows. A rectangular bracket 51 is placed on spindle 37 with a bearing 52 on each side of bracket portion 21, the bearings 52 being between the arms 47 and 48 of handle bracket 46. Projecting downwardly from bracket 51 on either side of supporting bracket portion 20 are a pair of fingers 53, the bracket portion 20 thus acting as a guide to prevent bracket 51 from rotating with the spindle, but permitting it to be moved vertically. Fingers 53 have horizontal flanges 54 on their outer side walls for removably holding a feed or pusher plate 55 by means of complementary flanges 55' which may be slid over flanges 54, flanges 55' being flared outwardly at their outer ends as shown at 56 to assist in guiding the plate onto the flanges 54 and a stop 57 for limiting its movement and properly positioning the plate. The feed plate 55 has a pair of crossed V-shaped grooves 58 therein complementary to the separator blades 35 and in which the blades 35 are seated when the feed plate is in its lowest position so that the butter may be fed completely past blades 35. The feed plate 55 is of such size that it will just fit inside holder 27 and the free edges of the holder 27 are flared outwardly somewhat as indicated at 60 to facilitate placing the block of butter in the holder. Thus as handle 45 is moved vertically down, it will feed the butter past blades 35, cutting it longitudinally, and as the handle is rotated, it will move cutting wire 44 past the lower side of blades 35 to cut off the chips which will thus fall down into the bowl 18 placed therebeneath.

To provide that these chips may be of predetermined and uniform thickness, bracket portion 19 has a rectangular socket 61 while bracket portion 21 has a corresponding rectangular opening 62 through which a measuring stick 63, shown detached in Figs. 8 and 9, may be dropped and locked in place by a set screw 64. The measuring stick has a series of staggered steps 65 which are spaced a vertical distance equal to the desired thickness of the butter chips, there being another similar series of steps 66 which are differently spaced, so that the adjustment may be changed by removing the stick after loosening lock screw 64, and reversing it. As is obvious, other measuring sticks having differently spaced steps may be provided. To cooperate with these measuring steps, arm 47 of handle bracket 46 is cut away as at 67 leaving stops 68 which will abut against the sides of the measuring stick to limit the to and fro turning movements of the handle 45 and associated parts. Projecting downwardly from the under side of arm 47 at the cut away portion 67 are a pair of ears 70 through which passes a pivot shaft 71 passing through ears 72 of a tongue 73, a spring 74 about pivot 71 serving to hold the tongue horizontal against the under side of bracket 47, but permitting it to be yieldingly depressed to the position shown in Fig. 11. The space between the sides 73' of tongue 73 and stop 68 is somewhat larger than the width of steps 65, so that when one stop 68 is abutting one side of the measuring stick, the tongue 73 will clear the step on that side, but will come to rest on the step on the other side. Then when the handle 45 is swung back again, the tongue will come to rest on the alternate lower step, and so on. Thus, every time the handle is depressed, it feeds the butter down a distance equal to the vertical distance between the steps, and when it is swung laterally it cuts off the chips. When the handle 45 is moved vertically up, tongue 73 will yield about its pivot 71 and ride past the steps 65, as in Fig. 11. Thus to bring the handle and follower 55 to its upper position all that is necessary is to lift up on the handle 45 and carry it as far as it will go.

To prevent the cut chips from riding on the cutting wire 44, a guard 75 is placed below the wire 44 in alignment with holder 27. This chip guard, as shown in Figs. 5, 6 and 7 comprises a flanged strap 76 having a notch 77 to catch on a projecting button 78 on the flat side of bracket portion 20, the flanges 80 embracing the sides of bracket portion 20 to steady the guard and preventing the butter being stained by touching the metal of the bracket. Projecting laterally from strap 76 is an arm 81 having an angled depending strap 82 to which is integrally attached the rectangular chip guard 75. As will be apparent, this guard and its support may be stamped out of a single piece of material and properly folded. The inner surface of this guard, as well as the inner surface of the holder and feed plate 55 may all be enamelled for sanitary means.

Figure 16:
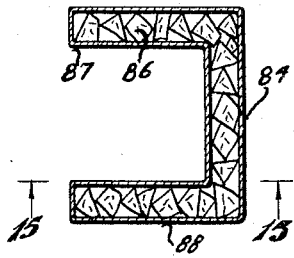
Fig. 16 is a horizontal section of the refrigerant container on the plane of line 16—16 of Fig. 15, and Figs. 17, 18 and 19 are sections of modified embodiments of the refrigerant container.

To provide means for keeping the butter cold and hard while in the holder 27, a refrigerant container is formed to be removably mounted about the holder 27, and is supported thereon by fitting snugly about its sides and on the straps 29, as shown at 84 in Fig. 16. In its simplest form, this container 84 has a cover 85 through which a refrigerant 86, comprising cracked ice or dry ice, that is, solidified carbon dioxide, may be inserted. The melting of this refrigerant serves to chill the butter in holder 27, the heat from the butter passing through the inner walls of the holder 27 and the walls of the container to the refrigerant.

Figure 17:
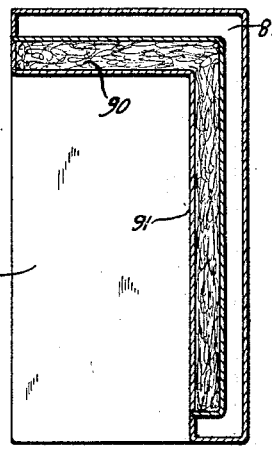
Figure 18:
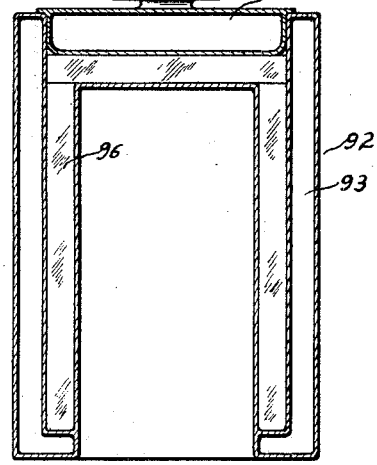
Figure 19:
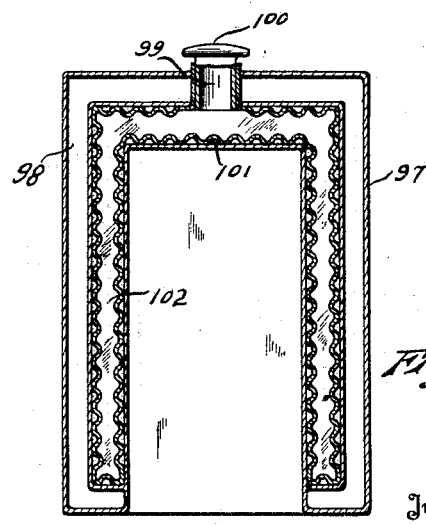

As is obvious in the simple form provided above, the heat will be absorbed through the outer walls of the container and to prevent this, the container may be made with its outer wall insulated by covering with a non-heat conductor or constructed as shown in the forms in Figs. 17, 18 and 19, each of which embodiments may be substituted for the container 84 as shown in Fig. 16.

The refrigerant container 88, Fig. 17 has insulating chamber 89 which may be a vacuum chamber or filled with an insulating material serving to insulate the refrigerant substance 90, which is in contact with the inner walls 91 thereof. In this case, the refrigerant substance 91 may be any good heat absorbing substance, as certain well known salt solutions, and is prepared by first placing the container 88 in a refrigerator until the refrigerant 91 is thoroughly chilled, whereupon it may be put in use, the insulating vacuum chamber 89 serving to reduce absorption of heat through the outer walls.

In Fig. 18 is shown a refrigerant container 92 having an insulating chamber 93 either a vacuum or filled with insulation. This container 92 has a large opening which is closed by a cover 94 which likewise has an insulating chamber 95 therein. In this form, the refrigerant comprises rectangular ice cubes 96 which are prepared of a size to just fit in the container, and then cover 94 is placed thereon to reduce absorption of heat through the opening.

An additional embodiment of a refrigerant container is shown at 97 in Fig. 19. In this embodiment there is likewise an insulating chamber 98 which may be a vacuum chamber or contain insulation having an opening 99 leading to the interior for which a closure 100 is provided, allows access to the interior of the container. The interior walls 101 of the container 97 are formed with corrugations as shown, and hence are expansible and contractible without rupturing the container. In this case, the refrigerant is prepared by pouring water or other appropriate solidifiable liquid through opening 99. The container 97 is then placed in a refrigerator until the liquid has solidified into a solid piece of ice 102, the walls 101 expanding as ice forms, which they may do without leaking or deforming the container because of their shape as shown. After being thus properly prepared, this container 97 may be used in the same manner as the other embodiment as just described.

The operation is as follows. It having been decided as to the size of the chips wanted, the proper side of a measuring stick 63 is placed in this machine and locked in place by screw 64 to prevent unauthorized manual readjustment of the same. The feed plate or follower 55, holder 27 and guard, having been thoroughly cleaned, each is manually put in place, the guard being hung on button 78, the feed plate being slid onto flanges 54 and holder 27 being placed with notches 32 over shaft 26, and then pivoted to the horizontal position, cutting wire 44 having been cleaned while in place on the device. A bowl of ice water, such as conventionally used to hold butter chips, is put in place and the butter is placed on holder 27'. The handle 45 is moved vertically to its upper limit. The block of butter is then placed in the holder 27' which is then swung about its pivot to the position at 27. Refrigerant container 84, or any of the other embodiments 88, 92 or 97, may be then placed about holder 27, if desired, and is supported by the inner walls of the container fitting snugly about holder 27 while the bottom of the container is held up by straps 29 to thus keep the container in place. The handle 45 is then pressed vertically down, which will feed the butter down past blades 35 the downward feed being stopped by tongue 73 abutting the topmost step 65. The handle 45 is then rotated to cause the tongue to clear this step, and the rotation of the handle through its splined connection with spindle 37 will rotate the bow 43 to cause wire 44 to travel just below blades 35 and cut off the projecting butter into chips, which chips will fall straight down into the bowl 18, the guard 75 overcoming any tendency of the butter being pushed laterally. The tongue 73 being clear of the top step 65, the downward pressure on the handle against it forces the follower 55 downwardly until tongue 73 comes into contact with the next staggered step which will again feed the butter past blade 35, and the subsequent return swing of the handle will move the wire back to again cut off the chips. The handle may be thus continually swung back and forth while being depressed, until the butter has all been fed through and cut into chips. Then, the handle may be raised vertically in one movement, the tongue 73 swinging downwardly to pass steps 65 and the refrigerant container having been slipped off, if it is used, the holder 27 may be again swung to the position at 27' to have more butter placed in it and the operation be repeated. Although it has been shown of a size to hold a pound of butter, it is obvious that smaller size blocks may be used in this device, and that the machine could be made of a size to hold larger blocks, the number of blades being correspondingly increased.

It will be understood that during each lateral swing of the handle 45 the follower 55 remains stationary, because catch 73 is resting on one of the lugs or steps 65, until this catch swings far enough so that the lug or step on which it is resting comes in alignment with one of the spaces at the opposite ends of the catch and between it and the shoulders 68. At this time the cutting wire 44 has passed completely across the butter cutting off four chips which separate and fall into bowl 18. Also at this time the downward pressure on handle 45 forces it and follower 55 downwardly so that catch 73 rests on the next lower lug or step 65. This downward movement forces more butter past the cutters 35 the amount being determined by the spacing of the lugs or steps 65. The handle is then swung in the opposite direction cutting off another set of chips and when this movement is again limited by the opposite stop 68 the follower and handle again move down and this movement is limited by catch 73 engaging the next lower step 65 and so on. (See Fig. 10.) Thus to cut up a pound of butter the handle and follower are raised to their upper position shown in Fig. 1 and holder 27 swung forwardly, The block of butter is placed in the holder which is then swung back to its upright position. The follower 55 is then lowered to rest on top of the butter and the operator presses down on the handle and swings it back and forth as above described. Each lateral swing cuts off four chips by the wire 44 and the downward movement at each end of the lateral swing feeds the proper amount of butter past the cutters 35 for the next movement of the wire. If the lugs or steps 65 are spaced a greater distance apart the chips will be thicker and vice versa. The operator with this device can with one hand very quickly and uniformly cut a block of butter.

It is preferred to space an upper lug or step 65' above the top lug 65 so that as the handle and follower are raised to their upper position the catch 73 will rest on top of lug 65' and hold the follower 55 well above the top (T) of the block of butter so that there will be plenty of clearance to bring the holder 27 and the butter into position. The top lug 65 is so located that as catch 73 moves off lug 65' and rests on top of top lug 65 the follower 73 will just rest on top of the butter. The measuring stick can be properly located for this by loosening set screw 64 and then tightening after the stick has been adjusted. This arrangement helps to speed up operation of the device as no preliminary false movements are required to get the follower in position for feeding and still proper clearance is provided for placing of the butter.

Thus it will be seen that this invention provides a butter chip cutter which is easy and quick to operate; which will cut the chips to a uniform size so that there will always be the same number of chips per pound; that the size desired may be set at the will of the hotel or restaurant owner or management and not be tampered with manually; that the parts which contact with the butter may be easily manually removed for cleaning without using tools, and that the chips will not scatter due to the guard and also will not stick together, due to their dropping away separately into the bowl as soon as cut, and that butter need not be handled manually at all.

The device may be used with or without the refrigerator container or butter cooling means as is found desirable. In cutting a large amount of butter the cooler will probably not be used, but in small restaurants where it is desirable to cut only a small amount of butter at a time or only as ordered, this device will keep the butter hard and in good condition for some time.

Having thus set forth the nature of this invention, what is claimed is:

1. A butter chip cutter comprising a support, a spindle, bearings in said support for said spindle, a splined portion of said spindle projecting above said support, butter holding means on said support, cutting means movably supported below said holding means by said spindle, a feeding bracket slidable up and down said spindle, and a handle bracket splined on said spindle for operating said cutting means and slidable up and down the spindle for operating said feeding means.

2. A butter chip cutter comprising a support, a spindle, bearings in said support for said spindle, a splined portion of said spindle projecting above said support, butter holding means on said support, cutting means movably supported below said holding means by said spindle, a feeding bracket slidable up and down said spindle, a handle bracket splined on said spindle for operating said cutting means and said feeding means, a staggered step measuring means supported by said bracket, and a horizontal tongue on said handle bracket cooperating with said step means limiting the down feed to one step between each cut.

3. A butter chip cutter comprising a support, a spindle, bearings in said support for said spindle, a splined portion of said spindle projecting above said support, butter holding means on said support, cutting means movably supported below said holding means by said spindle, a feeding bracket slidable up and down said spindle, a handle bracket splined on said spindle for operating said cutting means and said feeding means, a staggered step measuring means supported by said bracket, a horizontal tongue on said handle bracket cooperating with said step means limiting the down feed to one step between each cut, said tongue being pivoted, and spring means permitting the tongue to turn downwardly whereby to permit the handle to be raised to initial cutting and feeding position.

4. A butter chip cutter comprising a support, a spindle, bearings in said support for said spindle, a splined portion of said spindle projecting above said support, butter holding means on said support, cutting means movably supported below said holding means by said spindle, a feeding bracket slidable up and down said spindle, a handle bracket splined on said spindle for operating said cutting means and said feeding means, a staggered step measuring means removably supported by said bracket and a horizontal tongue on said handle bracket cooperating with said step means limiting the down feed to one step between each cut.

5. A butter chip cutter comprising a support, a spindle, bearings in said support for said spindle, a splined portion of said spindle projecting above said support, butter holding means on said support, cutting means movably supported below said holding means by said spindle, a feeding bracket slidable up and down said spindle, a handle bracket splined on said spindle for operating said cutting means and said feeding means, a staggered step measuring means removably supported by said bracket, a horizontal tongue on said handle bracket cooperating with said step means limiting the down feed to one step between each cut, and means for locking said step means against removal.

6. A butter chip cutter comprising a support, a splined spindle having bearings in said support and projecting thereabove, butter holding means removably pivoted on said support, a chip guard aligned below said butter holding means and removably held in place by said support, means for feeding the butter through the holder, separator blades on said holder for cutting the butter longitudinally as it is fed, said feeding means including a removable feed plate and a feed bracket on said spindle, a handle bracket splined on said spindle for operating the feed bracket, a staggered step measuring means on said support, a yieldable tongue on said handle bracket cooperating with said steps to limit the downward movement and yield to allow upward movement, and cutting means affixed to said spindle to operate between said holder and said chip guard, the rotation of said handle bracket serving to operate the cutting means.

7. A butter chip cutter comprising a supporting means, a butter holder on said support substantially U-shape in cross section, means for feeding the butter step by step downwardly through said holder, means for cutting the butter transversely between successive steps, means for operating said feeding and cutting means, and means for pivoting said holder on said support to permit the upper end to swing downwardly in a direction away from the open side to expose said side for insertion of a block of butter.

8. A butter chip cutter comprising a supporting means, a butter holder on said support substantially U-shape in cross section, means for feeding the butter step by step downwardly through said holder, means for cutting the butter transversely between successive steps, means for operating said feeding and cutting means, ears connected with the holder having open sided recesses, and means on the support adapted to enter said recesses to pivot the holder to the support to permit the upper end to swing downwardly in a direction away from the open side to expose said open side and also to permit removal of the holder from the support.

9. In a butter chip cutter, a supporting means, a butter holder on said supporting means, butter cutting means at one end of the holder, a plunger plate in the holder, a support for said plate having transverse guide means, cooperating means on the plate engaging the guide means to mount the plate and permitting attaching and detaching the plate by a movement transversely the direction of feed, said holder being open on one side and movable away from the plunger plate to permit removal of said plate, and means for forcing the plate support forwardly to feed the butter to the cutting means.

10. In a butter chip cutter, a supporting means, a butter holder on said supporting means, butter cutting means at one end of the holder, a feed bracket movable longitudinally of the butter holder having ribs extending transversely its direction of movement, a plunger plate having side flanges to engage over said ribs to secure the plate to the bracket and permit attaching and detaching by a movement transversely the direction of movement of the bracket, said holder being open on one side and movable laterally away from the plunger plate to permit removal of said plate, and means for advancing the bracket to feed the butter to the cutting means.

11. A butter chip cutter comprising a support, a butter holder on said support, means for cutting the butter at one end of the support, a pusher movable forwardly in the holder to feed the butter to the cutting means and a control means for the pusher comprising a plurality of stationary shoulders spaced from each other longitudinally of the holder a distance to correspond with the thickness of the chips to be cut, means movable with the pusher and cooperating with said shoulders to limit forward movements of the pusher to the distances between adjacent shoulders, and means for operating the cutting means while forward movement of the pusher is arrested by said shoulders.

12. A butter chip cutter comprising a support, a butter holder on said support, means for cutting the butter at one end of the support, a pusher movable forwardly in the holder for feeding the butter to the cutting means, a measuring stick held stationary in the support and having a plurality of gauge teeth spaced from each other a distance corresponding to the thickness of the chips to be cut, means connected to the pusher for advancing it and having means to engage the teeth in succession to give a step by step movement to the pusher and hold it between these movements, and means for operating the cutting means while forward movement of the pusher is arrested by said means.

In testimony whereof we affix our signatures.

CHARLES A. BREWER.
PHILIP J. KURY.